Patented Jan. 6, 1953

2,624,730

UNITED STATES PATENT OFFICE 2,624,730

6-HALOARYL-3-PYRIDAZONES

Edgar Alfred Steck, Albany, N. Y., assignor to Sterling Drug Inc., New York, N. Y., a corporation of Delaware No Drawing. Application August 16, 1950, Serial No. 179,879

14 Claims. (Cl. 260—250)

---

This invention relates to new 6-aryl-3-pyridazones having the formula

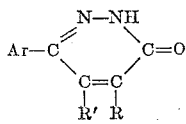

wherein Ar is a phenyl radical substituted by 1 to 2 halogen atoms, and R and R' are each hydrogen or a lower-alkyl radical. This invention also relates to the preparation of these compounds. These new substances are useful as chemotherapeutic agents, and, in particular are valuable as amebacides.

The halogen atom or atoms in the 6-halophenyl radical can be any of four halogens, flourine, chlorine, bromine or iodine. If two halogen atoms are present in the ring, they can be the same or different.

The groups R and R' in positions 4 and 5 respectively of the pyridazone ring each represent a hydrogen atom or a lower-alkyl group. R and R' can be the same or different and one can be hydrogen and the other a lower-alkyl group. By a lower-alkyl group is meant one having six carbon atoms or less.

The following compounds are illustrative of the invention: 6-(4-chlorophenyl)-3-pyridazone; 6 - (3,4 - dichlorophenyl) - 3 - pyridazone; 6-(2,4 - dichlorophenyl) - 3 - pyridazone; 6 - (4-bromophenyl) - 3 - pyridazone; 6 - (4 - iodophenyl) - 3 - pyridazone; 6 - (3,4-dichlorophenyl) - 5 - methyl - 3 - pyridazone; 6 - (3,4-dichlorophenyl) - 4 - methyl - 3 - pyridazone; 6 - (4 - fluorophenyl) - 3 - pyridazone; 6 - (3,5-diiodophenyl) - 3 - pyridazone; 6 - (3 - chloro-4 - bromophenyl) - 3 - pyridazone; 6 - (3,4-dichlorophenyl) - 4 - ethyl - 3 - pyridazone; 6-(3,4 - dichlorophenyl) - 4,5 - dimethyl - 3-pyridazone; and 6 - (3,4 - dichlorophenyl) - 5-butyl-3-pyridazone.

These new compounds are synthesized by condensing a keto acid of the formula

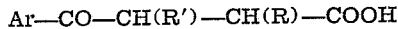

with hydrazine under alkaline conditions and dehydrogenating the resulting 6-aryl-dihydro-3-pyridazone with bromine.

The starting material is prepared by a Friedel-Crafts reaction between a halogenated benzene and succinic anhydride or an alkylated succinic anhydride which produces a substituted benzoylpropionic acid

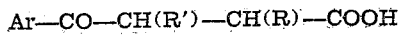

The latter reacts with hydrazine under alkaline conditions to give a 6-aryl-dihydro-3-pyridazone which can be assigned the structure

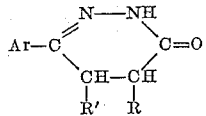

or a tautomeric form thereof. The final step is a dehydrogenation using bromine to give the desired 6-aryl-3-pyridazone.

If an unsymmetrically alkylated succinic anhydride is used in the Friedel-Crafts reaction, a mixture of two isomeric benzoylpropionic acids is formed. These can usually be separated by fractional crystallization either at this point or later on in the synthesis of the corresponding pyridazone derivatives.

The following examples further illustrate my invention.

Example 1

(a) *Beta - (3,4 - dichlorobenzoyl) propionic acid.*—A suspension of 120 g. (1.2 m.) of powdered succinic anhydride in 450 cc. of technical 95% o-dichlorobenzene was stirred vigorously under reflux and 325 g. (2.4 m.) of powdered anhydrous aluminum chloride was added very rapidly. The exothermic reaction caused the temperature to rise to about 70° C. and much hydrogen chloride was evolved. The mixture was maintained at about 65° C. for one hour, then cooled and poured onto about 2 kg. of ice. The whole was made strongly acid with concentrated hydrochloric acid and steam distilled to remove excess o-dichlorobenzene. The distilland was cooled and the solid collected by filtration, dissolved in excess hot concentrated sodium bicarbonate solution at pH 8, stirred with activated charcoal, and the solution was filtered through filter-aid. The crude beta-(3,4-dichlorobenzoyl) propionic acid precipitated upon acidification of the clarified solution; the solid was collected by filtration, washed with cold water and crystallized twice from alcohol to give 170.0 g. of beta-(3,4-dichlorobenzoyl) propionic acid, M. P. 166-167° C. The structure of the compound was confirmed by the formation of 3,4-dichlorobenzoic acid when it was oxidized with potassium permanganate.

Anal. Calcd. for $C_{10}H_8O_3Cl_2$: C, 48.61; H, 3.26; Cl, 28.70. Found: C, 48.54; H, 3.08; Cl, 28.45.

(b) *6 - (3,4 - dichlorophenyl) - 4,5 - dihydro-3 - pyridazone.*—Beta - (3,4 - dichlorobenzoyl)- propionic acid (99.0 g., 0.4 m.) was dissolved in 400 cc. of 0.1 N potassium hydroxide solution at 80° C. and then mixed with a solution of 52.0 g. (0.4 m.) of hydrazine sulfate in 400 cc. of 0.1 N potassium hydroxide also at 80° C. The well-stirred mixture was heated under reflux on a steam bath for two hours, then cooled and the solid collected by filtration, giving 96.4 g. of crude 6 - (3,4 - dichlorophenyl) - 4,5 - dihydro - 3-pyridazone. Several crystallizations from alcohol using activated charcoal for decolorizing gave 83.5 g. of 6 - (3,4 - dichlorophenyl) - 4,5-dihydro - 3-pyridazone, M. P. 172–173° C.

Anal. Calcd. for $C_{10}H_8Cl_2N_2O$: C, 49.41; H, 3.32; Cl, 29.17. Found: C, 49.35; H, 3.05; Cl, 29.30.

(c) 6-(3,4-dichlorophenyl)-3-pyridazone

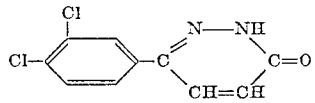

A solution of 339.5 g. (1.39 m.) of 6-(3,4-dichlorophenyl)-4,5-dihydro-3-pyridazone in 2800 cc. of glacial acetic acid was stirred at 50° C. while 225 g. of bromine in 500 cc. of glacial acetic acid was added over a period of one hour. After the addition was complete, the temperature was maintained at 60–65° C. for forty-five minutes. The mixture was then cooled and the solid collected by filtration and washed with ethyl acetate. The solid was then suspended in water, made basic with concentrated ammonium hydroxide and stirred for ten minutes. After collecting and drying, 310 g. of 6-(3,4-dichlorophenyl)-3-pyridazone, M. P. 256.5–257.5° C., was obtained. Repeated crystallization from 2-methoxyethanol gave a sample of 6-(3,4-dichlorophenyl)-3-pyridazone, M. P. 258–259° C.

Anal. Calcd. for $C_{10}H_6Cl_2N_2O$: C, 49.82; H, 2.51; N, 11.62. Found: C, 49.69; H, 2.40; N, 11.49.

*Example 2*

(a) Beta-(2,4-dichlorobenzoyl)propionic acid, was prepared according to the method of Example 1, part (a) starting with m-dichlorobenzene and succinic anhydride. The beta-(2,4-dichlorobenzoyl)propionic acid melted at 77.5–78° C. after crystallization from n-heptane. Oxidation with potassium permanganate gave 2,4-dichlorobenzoic acid, thus confirming the structure.

Anal. Calcd. for $C_{10}H_8O_3Cl_2$: C, 48.61; H, 3.26; Cl, 28.70. Found: C, 48.77; H, 3.39; Cl, 28.36.

(b) 6-(2,4-dichlorophenyl) - 4,5-dihydro-3-pyridazone was obtained according to the method described in Example 1, part (b) by the reaction of beta-(2,4-dichlorobenzoyl)propionic acid and hydrazine sulfate. The 6-(2,4-dichlorophenyl)-4,5-dihydro-3-pyridazone was obtained in the form of white needles, M. P. 172–173° C., when recrystallized from dilute alcohol.

Anal. Calcd. for $C_{10}H_8Cl_2N_2O$: C, 49.41; H, 3.32; N, 11.32. Found: C, 49.66; H, 3.14; N, 11.40.

(c) 6-(2,4-dichlorophenyl)-3-pyridazone

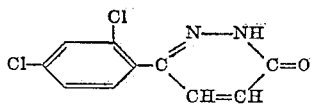

was prepared from 6-(2,4-dichlorophenyl)-4,5-dihydro-3-pyridazone according to the method of Example 1, part (c). The 6-(2,4-dichlorophenyl)-3-pyridazone was obtained in the form of white fibrous needles, M. P. 216–216.5° C., when recrystallized from alcohol.

Anal. Calcd. for $C_{10}H_6Cl_2N_2O$: C, 49.82; H, 2.51; N, 11.62. Found: C, 49.69; H, 2.23; N, 11.52.

*Example 3*

(a) Beta - (4 - chlorobenzoyl)propionic acid, M. P. 131° C., was obtained from chlorobenzene and succinic anhydride according to the method of Example 1, part (a).

(b) 6-(4-chlorophenyl) - 4,5-dihydro-3-pyridazone was prepared from beta-(4-chlorobenzoyl)-propionic acid and hydrazine sulfate according to the method of Example 1, part (b). The 6-(4-chlorophenyl)-4,5-dihydro-3-pyridazone was obtained in the form of white prisms, M. P. 178.5–179° C., when recrystallized from alcohol.

Anal. Calcd. for $C_{10}H_9ClN_2O$: Cl, 17.04; N, 13.43. Found: Cl, 17.04; N, 13.62.

(c) 6-(4-chlorophenyl)-3-pyridazone

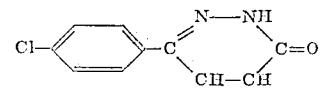

was prepared from 6-(4-chlorophenyl)-4,5-dihydro-3-pyridazone according to the method of Example 1, part (c). The 6-(4-chlorophenyl)-3-pyridazone was obtained in the form of white needles, M. P. 271–271.5° C., when recrystallized from glacial acetic acid.

Anal. Calcd. for $C_{10}H_7ClN_2O$: Cl, 17.16; N, 13.56. Found: Cl, 17.34; N, 13.25.

*Example 4*

(a) Beta - (4 - bromobenzoyl)propionic acid, M.P. 148–149° C., was prepared from bromobenzene and succinic anhydride according to the method of Example 1, part (a).

(b) 6-(4-bromophenyl) - 4,5-dihydro-3-pyridazone was prepared from beta-(4-bromobenzoyl)-propionic acid and hydrazine sulfate according to the method of Example 1, part (b). The 6-(4-bromophenyl)-4,5-dihydro-3-pyridazone was obtained in the form of white needles, M. P. 168–168.5° C., when recrystallized from dilute alcohol.

Anal. Calcd. for $C_{10}H_9BrN_2O$: C, 47.45; H, 3.58; N, 11.07. Found: C, 47.52; H, 3.34; N, 11.22.

(c) 6-(4-bromophenyl)-3-pyridazone

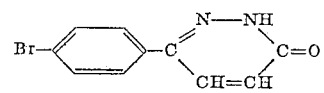

was prepared from 6-(4-bromophenyl)-4,5-dihydro-3-pyridazone according to the method of Example 1, part (c). The 6-(4-bromophenyl)-3-pyridazone was obtained in the form of white cubic crystals, M. P. 250–250.5° C., when recrystallized from alcohol.

Anal. Calcd. for $C_{10}H_7BrN_2O$: C, 47.82; H, 2.81; Br, 31.82. Found: C, 47.54; H, 2.70; Br, 31.90.

*Example 5*

(a) Beta-(4-iodobenzoyl)propionic acid, M. P. 180.5–182° C., was prepared from iodobenzene and succinic anhydride according to the method of Example 1, part (a).

(b) 6-(4-iodophenyl)-4,5-dihydro-3-pyridazone was prepared from beta-(4-iodobenzoyl)propionic acid according to the method of Example 1, part (b). The 6-(4-iodophenyl)-4,5-dihydro-3-pyridazone was obtained in the form of white prismatic needles, M. P. 199–199.5° C., when recrystallized from alcohol or ethyl acetate.

Anal. Calcd. for $C_{10}H_9IN_2O$: C, 40.02; H, 3.02; N, 9.34; I, 42.29. Found: C, 40.07; H, 3.30; N, 9.53; I, 42.40.

(c) 6-(4-iodophenyl)-3-pyridazone

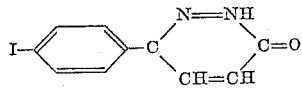

was prepared from 6-(4-iodophenyl)-4,5-dihydro-3-pyridazone according to the method of Example 1, part (c). The 6-(4-iodophenyl)-3-pyridazone was obtained in the form of fine white needles, M. P. 174–175° C., when recrystallized from ethyl acetate.

Anal. Calcd. for $C_{10}H_7IN_2O$: C, 40.29; H, 2.37; I, 52.58. Found: C, 40.07; H, 2.20; I, 42.40.

*Example 6*

(a) *Beta-(3,4-dichlorobenzoyl)-alpha-methylpropionic acid and beta-(3,4-dichlorobenzoyl)-beta-methylpropionic acid.*—A vigorously stirred mixture of 11.4 g. of alpha-methylsuccinic anhydride and 40 cc. of technical 95% o-dichlorobenzene was treated with 27 g. (0.2 m.) of powdered anhydrous aluminum chloride in the manner described for the preparation of beta-(3,4-dichlorobenzoyl)propionic acid in Example 1, part (a). A crude mixture (18 g.) of beta-(3,4-dichlorobenzoyl)-alpha-methylpropionic acid and beta-(3,4-dichlorobenzoyl)-beta-methylpropionic acid was obtained. Repeated crystallization of this mixture from n-heptane and from benzene gave 4.4 g. of beta-(3,4-dichlorobenzoyl)-alpha-methylpropionic acid, M. P. 121–121.5° C. (neutral equivalent 262.2). Complete purification of the beta-methyl isomer was not practical and 3.1 g. of impure beta-(3,4-dichlorobenzoyl)-beta-methylpropionic acid, M. P. 100–108° C., was obtained. The latter was employed as such in the remainder of the synthesis and the separation of isomers could be accomplished satisfactorily at the 3-pyridazone stage [see part (c)].

(b) *6-(3,4-dichlorophenyl)-4-methyl-4,5-dihydro-3-pyridazone and 6-(3,4-dichlorophenyl)-5-methyl-4,5-dihydro-3-pyridazone.*—The reaction of beta-(3,4-dichlorobenzoyl)-alpha-methylpropionic acid, M. P. 121–121.5° C., and hydrazine sulfate in potassium hydroxide was carried out by the method described in Example 1, part (b). A 90% yield of 6-(3,4-dichlorophenyl)-4-methyl-4,5-dihydro-3-pyridazone was obtained in the form of white blades, M. P. 167–168° C., after recrystallization from benzene.

Anal. Calcd. for $C_{11}H_{10}Cl_2N_2O$: C, 51.38; H, 3.92; N, 10.91. Found: C, 51.16; H, 3.86; N, 10.69.

The crude beta-(3,4-dichlorobenzoyl)-beta-methylpropionic acid, M. P. 100–108° C., from part (b) was converted to the dihydropyridazone by the same method. A yield of 85% was obtained, and from the mixture some pure 4-methyl isomer, M. P. 167–168° C., was isolated by crystallization from benzene. The bulk of the remaining material, which comprised impure 6-(3,4-dichlorophenyl)-5-methyl-4,5-dihydro-3-pyridazone, melting below 150° C., and was used directly for dehydrogenation to the 3-pyridazone type.

(c) 6-(3,4-dichlorophenyl)-4-methyl-3-pyridazone and 6-(3,4-dichlorophenyl)-5-methyl-3-pyridazone

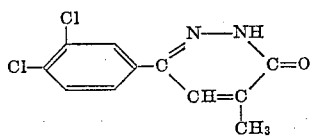

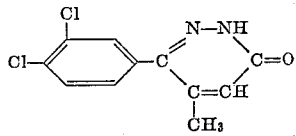

The reaction of 6-(3,4-dichlorophenyl)-4-methyl-4,5-dihydro-3-pyridazone, M. P. 167–168° C., with bromine in glacial acetic acid according to the method described in Example 1, part (c), gave a 75% yield of 6-(3,4-dichlorophenyl)-4-methyl-3-pyridazone which was obtained in the form of white needles, M. P. 251–252° C. when recrystallized from alcohol or dioxane.

Anal. Calcd. for $C_{11}H_8Cl_2N_2O$: C, 51.79; H, 3.16; N, 10.98. Found: C, 51.85; H, 3.35; N, 10.84.

The crude 6-(3,4-dichlorophenyl)-5-methyl-4,5-dihydro-3-pyridazone, M. P. below 150° C., was oxidized with bromine in glacial acetic acid according to the method described in Example 1, part (c). The crude product, a mixture, was obtained in 70–75% yield. Fractional crystallization from alcohol and from dioxane separated the mixture into 6-(3,4-dichlorophenyl)-4-methyl-3-pyridazone, M. P. 250–251° C., and 6-(3,4-dichlorophenyl)-5-methyl-3-pyridazone, M. P. 260–261° C., in the ratio 1:2.

Anal. of 5-methyl isomer; Calcd. for $C_{11}H_8Cl_2N_2O$: C, 51.79; H, 3.16; N, 10.98. Found: C, 52.08; H, 3.31; N, 11.18.

Throughout the specification the products have been represented formally as 6-haloaryl-3-pyridazones, although they can equally well be assigned the tautomeric enol form and can be designated as 6-haloaryl-3-hydroxypyridazines. The keto and enol forms are doubtless both present in equilibrium when in solution, but only one compound has been isolated from the reactions leading to each of the species described hereinabove, and there is no conclusive evidence for assigning either the keto or the enol form to the products. The keto form has been chosen arbitrarily for convenience.

I claim:

1. A 6-aryl-3-pyridazone having the formula

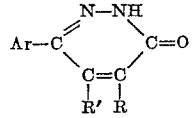

wherein Ar is a phenyl radical substituted by 1 to 2 halogen atoms, and R and R' are each a member of the group consisting of hydrogen and lower-alkyl radicals.

2. A 6-aryl-3-pyridazone having the formula

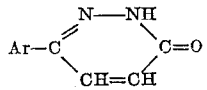

wherein Ar is a phenyl radical substituted by 1 to 2 halogen atoms.

3. 6-(4-chlorophenyl)-3-pyridazone having the formula

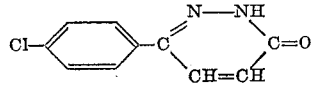

4. 6-(3,4-dichlorophenyl)-3-pyridazone having the formula

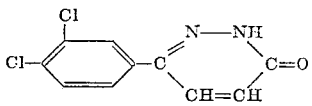

5. 6-(2,4-dichlorophenyl)-3-pyridazone having the formula

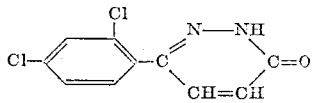

6. 6-(4-bromophenyl)-3-pyridazone having the formula

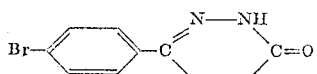

7. 6-(4-iodophenyl)-3-pyridazone having the formula

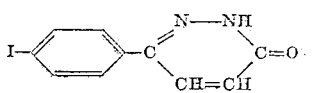

8. The process for preparing a 6-aryl-3-pyridazone having the formula

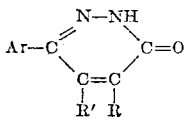

wherein Ar is a phenyl radical substituted by 1 to 2 halogen atoms, R and R′ are each a member of the group consisting of hydrogen and lower-alkyl radicals, which comprises condensing a keto acid of the formula Ar—CO—CH(R′)—CH(R)—COOH with hydrazine under alkaline conditions and dehydrogenating the resulting 6-aryl-dihydro-3-pyridazone with bromine.

9. The process for preparing a 6-aryl-3-pyridazone having the formula

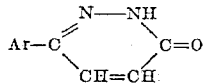

wherein Ar is a phenyl radical substituted by 1 to 2 halogen atoms, which comprises condensing a keto acid of the formula Ar—CO—CH$_2$—CH$_2$—COOH with hydrazine under alkaline conditions and dehydrogenating the resulting 6-aryl-dihydro-3-pyridazone with bromine.

10. The process for preparing 6-(4-chlorophenyl)-3-pyridazone, which comprises condensing beta-(4-chlorobenzoyl)propionic acid with hydrazine under alkaline conditions and dehydrogenating the resulting 6-(4-chlorophenyl)-4,5-dihydro-3-pyridazone with bromine.

11. The process for preparing 6-(3,4-dichlorophenyl)-3-pyridazone, which comprises condensing beta-(3,4-dichlorobenzoyl)propionic acid with hydrazine under alkaline conditions and dehydrogenating the resulting 6-(3,4-dichlorophenyl)-4,5-dihydro-3-pyridazone with bromine.

12. The process for preparing 6-(2,4-dichlorophenyl)-3-pyridazone, which comprises condensing beta-(2,4-dichlorobenzoyl)propionic acid with hydrazine under alkaline conditions and dehydrogenating the resulting 6-(2,4-dichlorophenyl)-4,5-dihydro-3-pyridazone with bromine.

13. The process for preparing 6-(4-bromophenyl)-3-pyridazone, which comprises condensing beta-(4-bromobenzoyl)propionic acid with hydrazine under alkaline conditions and dehydrogenating the resulting 6-(4-bromophenyl)-4,5-dihydro-3-pyridazone with bromine.

14. The process for preparing 6-(4-iodophenyl)-3-pyridazone, which comprises condensing beta-(4-iodobenzoyl)propionic acid with hydrazine under alkaline conditions and dehydrogenating the resulting 6-(4-iodophenyl)-4,5-dihydro-3-pyridazone with bromine.

EDGAR ALFRED STECK.

REFERENCES CITED

The following references are of record in the file of this patent:

Skraup et al.: Liebig's Annalen 462, 147–149 (1928).